(12) United States Patent
Maurer

(10) Patent No.: US 10,897,883 B2
(45) Date of Patent: Jan. 26, 2021

(54) DIVING BUBBLER LURE

(71) Applicant: Parting Waters, LLC, Novi, MI (US)

(72) Inventor: Michael W. Maurer, Novi, MI (US)

(73) Assignee: Parting Waters, LLC, Novi, MI (US)

( * ) Notice: Subject to any disclaimer, the term of this patent is extended or adjusted under 35 U.S.C. 154(b) by 301 days.

(21) Appl. No.: 16/050,047

(22) Filed: Jul. 31, 2018

(65) Prior Publication Data

US 2019/0045763 A1 Feb. 14, 2019

Related U.S. Application Data

(60) Provisional application No. 62/543,088, filed on Aug. 9, 2017.

(51) Int. Cl.
*A01K 85/01* (2006.01)

(52) U.S. Cl.
CPC .................................. *A01K 85/01* (2013.01)

(58) Field of Classification Search
CPC ................................. A01K 85/00; A01K 85/01
See application file for complete search history.

(56) References Cited

U.S. PATENT DOCUMENTS

| | | | | |
|---|---|---|---|---|
| 2,878,611 A * | 3/1959 | Netherton | ............... | A01K 85/01 43/42.06 |
| 4,098,017 A * | 7/1978 | Hall | ............... | A01K 85/01 43/42.06 |
| 4,257,182 A * | 3/1981 | Thom | ............... | A01K 85/16 43/42.06 |
| 5,261,181 A * | 11/1993 | Melton | ............... | A01K 85/00 43/42.06 |
| 6,079,145 A * | 6/2000 | Barringer | ............... | A01K 85/01 43/42.06 |
| 7,036,264 B2 * | 5/2006 | Barbary | ............... | A01K 85/00 43/42.06 |
| 7,380,365 B2 | 6/2008 | Noraker | | |
| 7,716,868 B2 * | 5/2010 | Emmott | ............... | A01K 85/16 43/42.06 |
| 9,038,310 B2 * | 5/2015 | Gaudieri | ............... | A01K 95/00 43/44.9 |
| 9,066,505 B1 * | 6/2015 | Vedder | ............... | A01K 85/01 |
| 2003/0126785 A1 * | 7/2003 | Poinski | ............... | A01K 85/01 43/42.06 |
| 2011/0277371 A1 * | 11/2011 | Norman | ............... | A01K 91/06 43/42.06 |
| 2015/0150226 A1 * | 6/2015 | McLeod | ............... | A01K 85/01 43/42.06 |

* cited by examiner

*Primary Examiner* — Richard G Davis

(74) *Attorney, Agent, or Firm* — Quinn IP Law

(57) ABSTRACT

A fishing lure is configured to be pulled below water. The fishing lure has a body defining an air cavity therein. A first hole is defined at a first end of the body, and a second hole is defined at a second end, opposite the first send, of the body. The air cavity is configured to carry air into the water and to progressively replace the carried air with water while diving below a surface of the water.

10 Claims, 5 Drawing Sheets

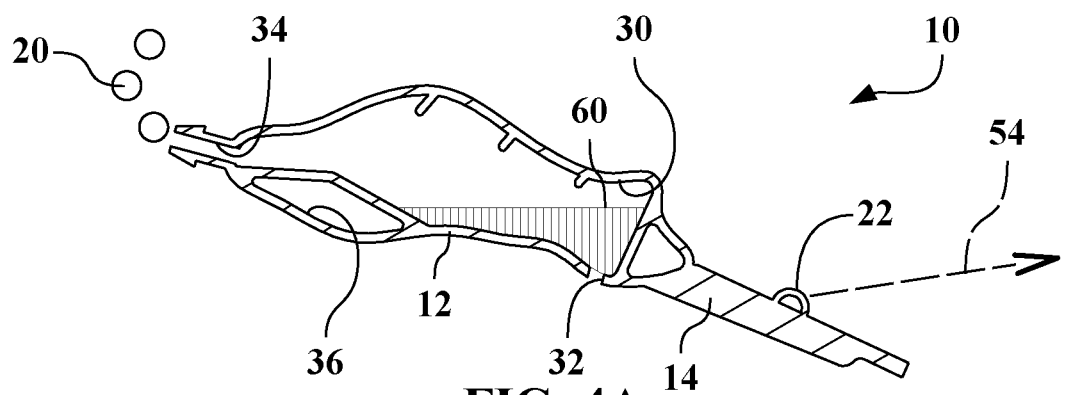
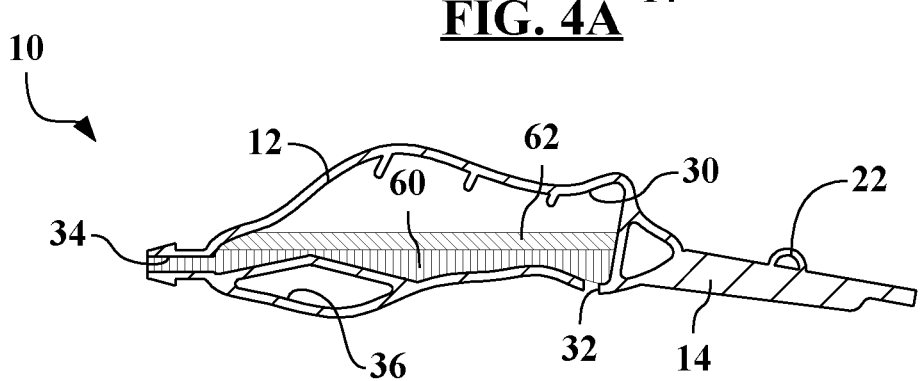
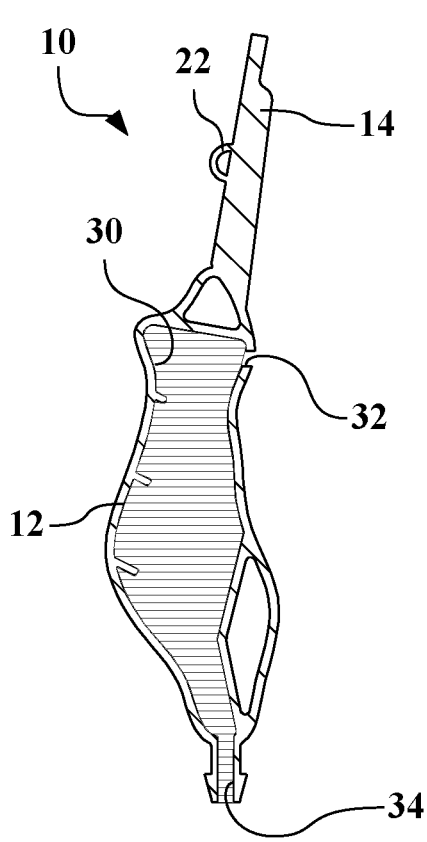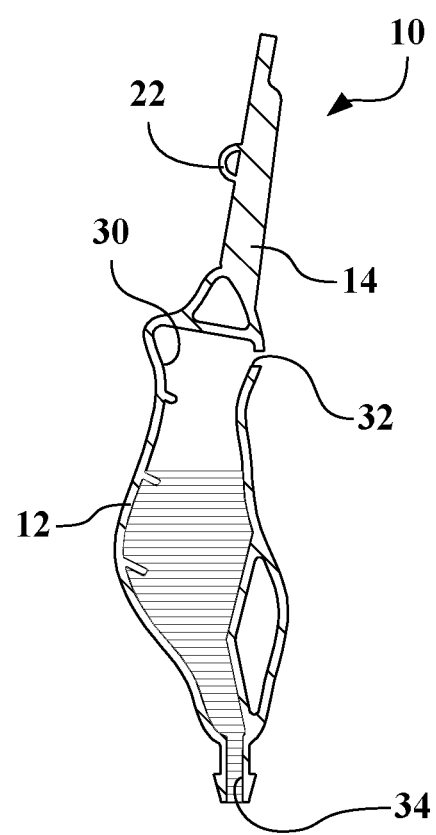
FIG. 5A    FIG. 5B

DIVING BUBBLER LURE

CROSS-REFERENCE TO RELATED APPLICATIONS

This application claims the benefit of U.S. Provisional Application No. 62/543,088, filed Aug. 9, 2017, which is hereby incorporated by reference in its entirety.

INTRODUCTION

This disclosure generally relates to fishing lures, which are types of artificial fishing baits designed to attract a fish's attention. Fishing lures may be used with a fishing rod and fishing reel, via a technique where a fishing line is held in the hands, or other fishing techniques.

SUMMARY

A fishing lure is provided. The fishing lure is configured to be pulled below water, such as following casting by a fishing pole.

The fishing lure has a body defining an air cavity. A first hole is defined at a first end of the body, and a second hole is defined at a second end of the body, such that the first hole and the second hole are on opposite ends of the body and the air cavity.

The air cavity is configured to carry air into the water and to progressively replace the carried air with water. Therefore, the fishing lure dives beneath the water and produces bubbles while being retracted.

The above features and advantages, and other features and advantages, of the present disclosure are readily apparent from the following detailed description of some of the best modes and other embodiments for carrying out the disclosure, which is defined solely by the appended claims, when taken in connection with the accompanying drawings.

BRIEF DESCRIPTION OF THE DRAWINGS

FIG. 4A is a plane intersection view of the diving bubbler lure taken generally along the line C-C of FIG. 2B, illustrating bubbles escaping the diving bubbler lure as it is subjected to a pull force.

FIG. 4B is a plane intersection view of the diving bubbler lure taken generally along the line C-C of FIG. 2B, illustrating stabilization levels during which no bubbles are escaping the diving bubbler lure.

FIG. 5A is another plane intersection view of the diving bubbler lure taken generally along the line C-C of FIG. 2B, illustrating a drainage position while the diving bubbler lure is substantially at a final fill stabilization point.

FIG. 5B is another plane intersection view of the diving bubbler lure taken generally along the line C-C of FIG. 2B, illustrating a continued drainage position.

DETAILED DESCRIPTION

Figure 1:
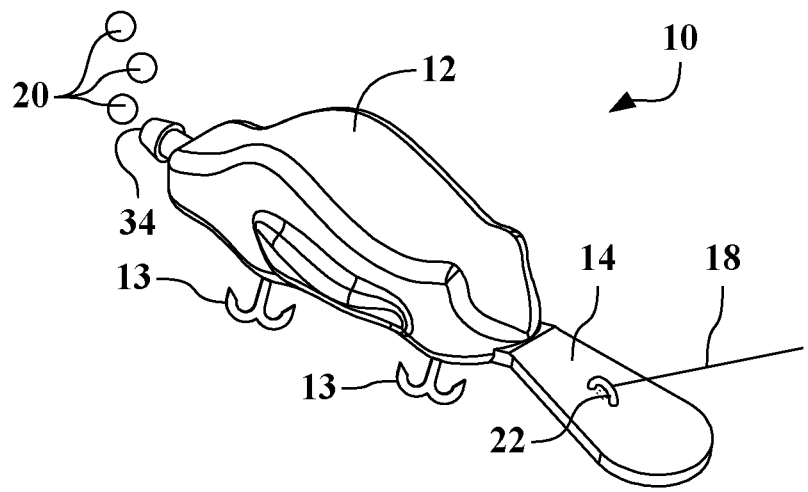
FIG. 1 is a schematic, isometric view of a diving bubbler lure.

Referring to the drawings, like reference numbers correspond to like or similar components wherever possible throughout the several figures. FIG. 1 shows an illustrative isometric view of a fishing lure, a lure assembly, or simply a lure 10, that may be used to catch fish. A lure body 12 may be formed as a hollow component.

The lure body 12 may be formed to improve visual aspects of the lure 10 for both functional and aesthetic purposes. In the example shown, the lure body 12 (and the lure 10, generally) is configured to resemble prey, such as a small fish or a small frog, but is not limited to the design shown in the figures. The body 12 may be formed from, for example and without limitation, plastic or composite materials, and may be, for example and without limitation, molded, machined, or 3D printed.

One or more hooks 13 may be attached to the lure 10, and are configured to retain fish attempting to eat the lure 10. The hooks 13 may be formed from metal or plastic, may be barbed at the ends, and may be detachable or removable from the lure 10. In several of the figures, the hooks 13 are removed or hidden from view to better illustrate other features or portions of the lure 10.

The front of the lure 10 includes a diving lip 14, to which a fishing line, or simply line 18, may be attached. The diving lip 14 is designed to act as an underwater wing and may be molded as part the lure body 12. The diving lip 14 uses pressure differential to pull the lure 10 downward as it is moved through the water. The lure 10 is configured to be pulled underneath the water—i.e., the lure 10 is a diving lure, as opposed to a surface lure—and to periodically expel air bubbles 20 in a controllable fashion as the lure 10 moves beneath the water. Expulsion of air bubbles 20 may attract fish, as it mimics bubbles coming from prey for which the fish are hunting.

While the present disclosure may be illustrated with respect to particular industries or applications, those skilled in the art will recognize the broader applicability of the products and methods described herein. Those having ordinary skill in the art will also recognize that terms such as "above," "below," "upward," "downward," et cetera, are used descriptively of the figures, and do not represent limitations on the scope of the appended claims. Where necessary, directional terminology may refer to the orientation of the lure 10 relative to gravity and to its typical, or intended, orientation within water. Any numerical designations, such as "first" or "second" are illustrative only and are not intended to limit the scope of the claims in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

Figure 2A:
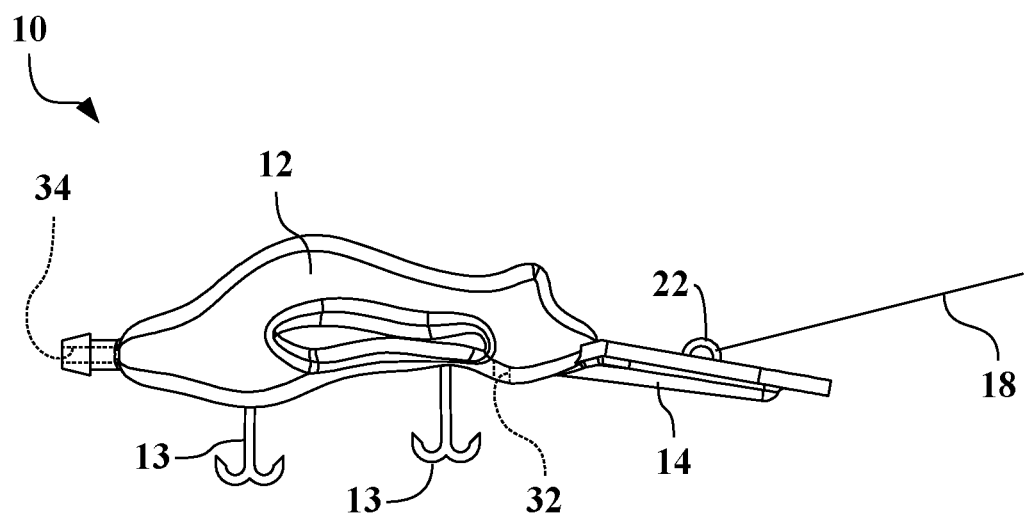
FIG. 2A is a schematic, side view of the diving bubbler lure of FIG. 1.
Figure 2B:
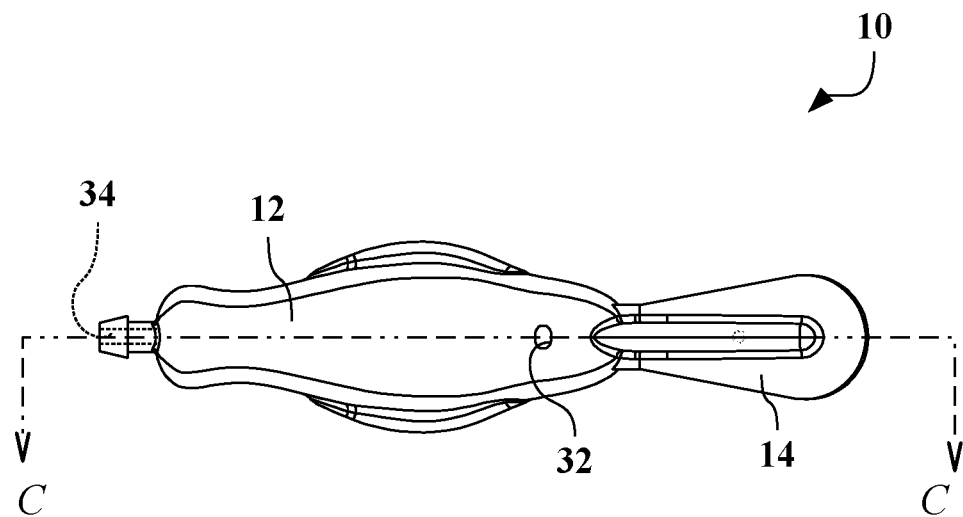
FIG. 2B is a schematic, bottom view of the diving bubbler lure of FIG. 1.
Figure 2C:
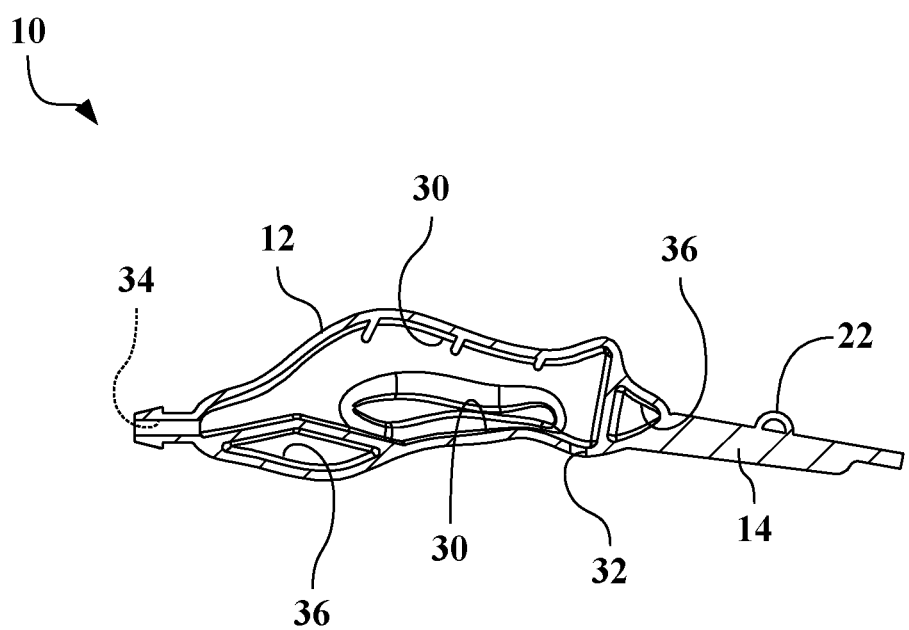
FIG. 2C is a schematic, cross-sectional view of the diving bubbler lure, taken generally along a section or line C-C of FIG. 2B.

Referring also to FIGS. 2A, 2B, and 2C, and with continued reference to FIG. 1, there are shown additional views of the lure 10. These views further illustrate structures making the lure 10 successful at attracting and capturing fish or other aquatic life. FIG. 2A shows a side view of the lure 10, FIG. 2B shows a bottom view of the lure 10 (without any hooks 13 attached thereto), and FIG. 2C shows a cross-sectional view of the lure 10 taken generally along a line C-C of FIG. 2B.

A line attachment 22 is formed on, or attached to, the diving lip 14. The line attachment 22 may be made of metal and added in a secondary process, or may be formed integrally as part of the lure body 12 and the diving lip 14.

The location of the line attachment 22 on the diving lip 14, in addition to the size and angle of the diving lip 14, itself, may be tuned for a desired diving depth and lure action, which may be a pendulum motion where the lure swings to the left and right, relative to a lateral line of the lure 10. The line 18 may be attached to the line attachment 22, or there may be leaders or other connecting structures between the two features.

The line 18 pulls the lure 10 through the water, such that the lure 10 generally moves left to right, as viewed in FIGS. 2A-2C. The lateral line of the lure 10 may be generally coincident with the section line C-C.

The lure body 12 is a shell that defines an air cavity 30 therein. The air cavity 30 is designed to bring or pull air underwater with the lure 10. On the front side (relative to motion of the lure 10 underneath the water, which is rightward in the figures), the lure body 12 has a first hole, entrance hole, or pressure relief 32. On the rear side of the lure body 12 is a second hole, or fluid exit 34.

As the lure 10 moves through the water, and depending on the angle of the lure 10, air bubbles 20 will escape from the air cavity 30 through the fluid exit 34 into ambient water during retrieval of the lure 10. Water slowly enters the air cavity through the pressure relief 32 as trapped air travels through the fluid exit 34 and into the water surrounding the lure 10. Note, however, that while only one hole is illustrated on each end of the lure 10, additional holes may be formed, such that multiple holes collectively perform the functions of the pressure relief 32 and the fluid exit 34 described herein.

As best viewed in FIG. 2C, one or more weight cavities 36 may be formed in the lure body 12 to house one or more buoyancy weights. The weight cavities 36 shown are hollow spaces that are placed on the front and back of the lure body 12. Buoyancy weights, such as those formed from metal or other materials, may be inserted into the weight cavities 36 to help balance the lure 10 and to create the desired lure action during retrieval.

Figure 3:
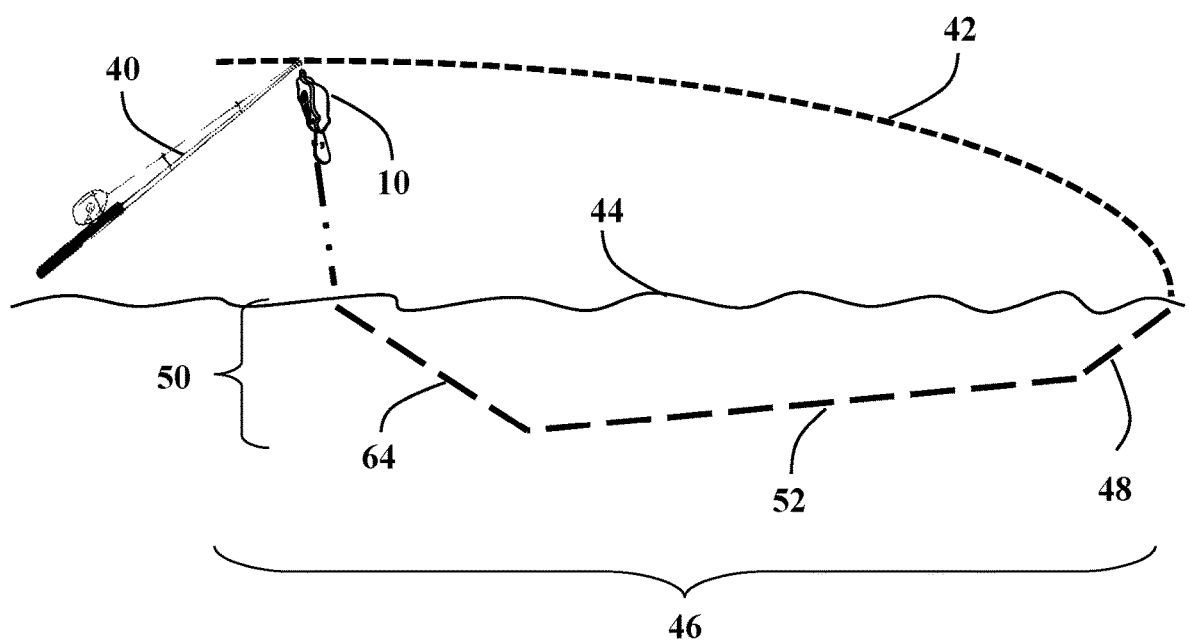
FIG. 3 is a schematic, diagrammatic view of a cast and retrieval path, broadly illustrating use of the diving bubbler lure.

Referring also to FIG. 3, and with continued reference to FIGS. 1-2C, there is shown a highly schematic diagram illustrating one typical pathway of the lure 10 as it is cast and retrieved during use. The lure 10 is cast into the water by a fishing pole 40 along a cast trajectory 42 toward a surface 44 of the water. The lure 10 will tend to float because of the buoyancy of air trapped within the air cavity 30. However, the lure 10 may have buoyancy weights—such as those made from metal or other heavy materials—stowed within the weight cavities 36. Alternatively, the weight cavities 36 may be solid and formed from the same material as the remainder of the body 12, such that buoyancy weight is provided by the body 12, itself.

The buoyancy weights within the weight cavities 36 counteract the lower density of the air within the air cavity 30, and allow the lure 10 to dive or sink below the surface 44. Once the lure 10 moves under the surface 44, it starts a retrieval process 46, as shown in FIG. 3. During a lure descend 48, the diving lip 14 acts as an underwater wing, creating a pressure differential that drives the lure 10 deeper underwater to a desired diving depth 50. A dive trajectory 52 carries the lure 10 through much of the retrieval process 46 while underwater.

Referring also to FIGS. 4A and 4B, and with continued reference to FIGS. 1-3, there are shown additional section views of the lure 10. FIGS. 4A and 4B are plane intersection views of the lure 10, taken generally along the section line C-C of FIG. 2B. FIG. 4A shows the lure 10 as bubbles 20 are escaping and water is entering the air cavity 30, while FIG. 4B shows the lure 10 stabilized, such that little or no exchange of water and air is occurring in the air cavity 30.

FIG. 4A illustrates how the lure 10 is filled, progressively, with water during the retrieval process 46. FIG. 4A also illustrates how the lure 10 expels air bubbles 20 during the retrieval process 46. Once the lure 10 has entered the dive trajectory 52, it relatively stabilizes its diving depth 50. For example, and without limitation, variance in the diving depth 50 during the dive trajectory 52 may be between two to four feet, depending on the retrieval speed, which varies the amount of downforce created by the diving lip 14.

A jerk 54 is a quick force applied to the line 18 by the fishing pole 40. The jerk 54 will cause the nose, formed largely from the diving lip 14, of the lure 10 to dive downward, as seen in FIG. 4A. This will lift the rear of the lure 10, allowing air from the air cavity 30 to escape from the fluid exit 34, creating exit air bubbles 20. As the air escapes, ambient water is able to fill the air cavity 30 through the pressure relief 32, this can be seen in FIG. 4A.

Water will fill the air cavity 30 to an initial or first fill stabilization level 60, as depicted in FIG. 4A. In general, air will be able to escape from a high point between the air cavity 30 and the ambient water surrounding the lure 10. In FIG. 4A, the fluid exit 34 is the highest point. However, in FIG. 4B, when the lure 10 is no longer tilted downward, the first fill stabilization level 60 blocks the fluid exit 34, and air is not able to escape the air cavity 30 through the fluid exit 34. Location of the pressure relief 32 and the fluid exit 34 below, relative to gravity, large portions of the air cavity 30 prevents escape of air from, and entrance of water to, the air cavity 30 when the lure 10 is relatively level (as shown in FIG. 4B). In configurations having multiple pressure reliefs 32, multiple fluid exits 34, or both, the holes may similarly be located low within the air cavity 30.

Upon application of another jerk 54, the lure 10 again tilts downward, as viewed in FIG. 4A, more bubbles 20 escape the fluid exit 34, and more water is able to enter the pressure relief 32. The additional water takes the lure to a second fill stabilization level 62, as also viewed in FIG. 4B. Note that the first fill stabilization level 60 and the second fill stabilization level 62 are shown for illustrative purposes only and are not necessarily indicative of actual first and second occurrences. Additional fill stabilization points may occur before and after those shown.

The pressure relief 32 and the fluid exit 34 are small relative to the cross-sectional area of the air cavity 30. Therefore, entrance of water to, and exit of air from, the air cavity 30 is restricted, and the air cavity 30 is not immediately filled with water in response to only a few movements.

Alternatively, relatively large holes would promote quick exhaustion of air from the air cavity 30. If the pressure relief 32 is large and the fluid exit 34 small, a rapid succession of small bubbles 20 may be forced out of the fluid exit 34; and if the fluid exit 34 is large, a few large bubbles 20 may quickly deplete air from the air cavity 30. Differing relative sizes of the pressure relief 32 and the fluid exit 34 may also occur as the result of the total area of multiple holes. In the configuration shown, the bubbles 20 are periodically released through much of the retrieval process 46, such that fish are attracted to the lure 10 for a relatively longer period of time.

In one exemplary, but non-limiting, configuration of the lure 10, the pressure relief 32 may be approximately four millimeters by two millimeters; the fluid exit 34 may have a diameter of approximately two millimeters; and the air cavity may be approximately twenty-five millimeters wide by twenty millimeters tall, at its widest point. Therefore, in the exemplary configuration, the areas of the pressure relief 32 and the fluid exit 34 are less than two percent of the largest cross section of the air cavity 30.

Furthermore, note that the pressure relief 32 and the fluid exit 34 are generally at opposing ends of the air cavity 30. This differs from configurations in which air might be forced sideways (relative to movement of the lure 10) from the air cavity 30. Placing the pressure relief 32 and the fluid exit 34 at opposing ends of the air cavity 30 also allows for fill stabilization, in which flow of air to the fluid exit 34 is prevented, such as at the first fill stabilization level 60 and the second fill stabilization level 62.

While the configuration shown in the figures includes only a single pressure relief 32 and a single fluid exit 34, other configurations may have multiple holes performing those functions relative to the air cavity 30. The total area of the holes may be controlled to restrict flow of water into the air cavity 30 and of air from the air cavity 30.

Note that the fluid exit 34 is below a centerline of the air cavity 30, and also of the body 12, which allows water partially filling the air cavity 30 to block the fluid exit 34 when the lure 10 is not tilted, or is tilted upward (at the front). The centerline may be approximately coincident with the top of the second fill stabilization level 62. In the configuration shown, the fluid exit 34 is substantially at the lowest point of the air cavity 30—although the pressure relief 32 is effectively lower, because the pressure relief 32 opens downward. If the fluid exit 34 were at the top of, or relatively high within, the air cavity 30, bubbles 20 would escape when the lure 10 is level, relative to gravity, which would deplete air within the air cavity 30 at higher rates, as only the restriction of the pressure relief 32 and the fluid exit 34 would limit exchange of water to, and air from, the air cavity 30.

The line attachment 22 may also be adjusted relative to the location of the fluid exit 34. Such that the pull force from the jerk 54 is either above, equal to, or below (relative to gravity) the fluid exit 34, which may alter the tilt of the lure 10 during expulsion of bubbles 20. However, downforce created by the diving lip 14 may control the tilt, regardless of position of the line attachment 22 relative to the fluid exit 34.

In some configurations, depending on the amount of restriction caused by the pressure relief 32 and the fluid exit 34, the force introduced by the jerk 54 may push water into the air cavity 30, forcing the bubbles 20 from the lure 10. However, most of the exchange of water and air within the air cavity 30 is due to gravity moving the water within the air cavity 30 away from the fluid exit 34, allowing air to escape through the fluid exit 34, as shown in FIG. 4A. The jerk 54 promotes escape of the bubbles 20 by introducing fluidic downforce via the diving lip 14.

After many, periodic releases of exit bubbles 20, the air cavity 30 will be filled, or substantially filled, with water and the lure 10 will reach a final fill stabilization point. At the final fill stabilization point, little or no air remains within the air cavity, or little or no air is able to reach the fluid exit 34, such that substantially no further exchange will occur between water and air in the air cavity 30. The lure 10 may be designed to reach the final fill stabilization point after, for example and without limitation, 10-15 seconds of travel along the dive trajectory 52. However, longer or shorter timeframes may also be used.

The time for the lure 10 to traverse the retrieval process 46 may be referred to as the retrieval time. Generally, the retrieval time is slightly longer than the amount of time needed for the lure 10 to reach the final fill stabilization point. The retrieval time may be, for example, and without limitation, twelve to twenty-five seconds (dependent on retrieval speed and force).

Therefore, the lure 10 is configured to exhaust substantially all of its air, as exit bubbles 20, some amount of time prior to reaching the end of the retrieval process 46. During this time, although the lure 10 is no longer releasing bubbles 20, fish that have identified the lure as prey may still take the bait and be captured by the lure 10. Toward the end of the retrieval process 46, as shown in FIG. 3, the line 18 pulls the lure 10 upward, causing it to enter a lure ascend 64, after which the lure 10 is pulled from the water.

All of the bubbles 20 expelled by the lure 10 are drawn into the lure 10 from outside of the water, taken underneath the water, and then controllably released. This is an alternative to creating bubbles while underneath the water, such as via cavitation or by creating pressure differentials significant enough to create or pull bubbles from the ambient water, itself.

Referring also to FIGS. 5A and 5B, there are shown additional plane intersection views, taken generally along line C-C of FIG. 2B, of the lure 10 after being removed from the water following the cast and retrieval. In FIGS. 5A and 5B, the lure 10 is shown in a drainage position.

FIG. 5A shows the lure 10 shortly after removal, such that water still fills the air cavity 30 to substantially the final fill stabilization point. FIG. 5B shows the lure 10 in continued drainage position.

After the lure 10 has been cast and retrieved, it will be pulled out of the water by the fishing pole and will hang in the drainage position. Initially, water may drain from both the fluid exit 34 and the pressure relief 32 until the water level falls below the pressure relief 32. Thereafter, water may drain from the air cavity 30 through the fluid exit 34 while using the pressure relief 32 as a vent to allow air back into the air cavity 30 for quick drainage. The lure 10 is configured to quickly drain, such that it will quickly be ready to cast again. The drainage time of the lure 10 may be, without limitation, between two to ten seconds. Drainage time can be tuned by altering the size, shape, number of exits, and location of the fluid exit 34 and pressure relief 32.

Figure 6:
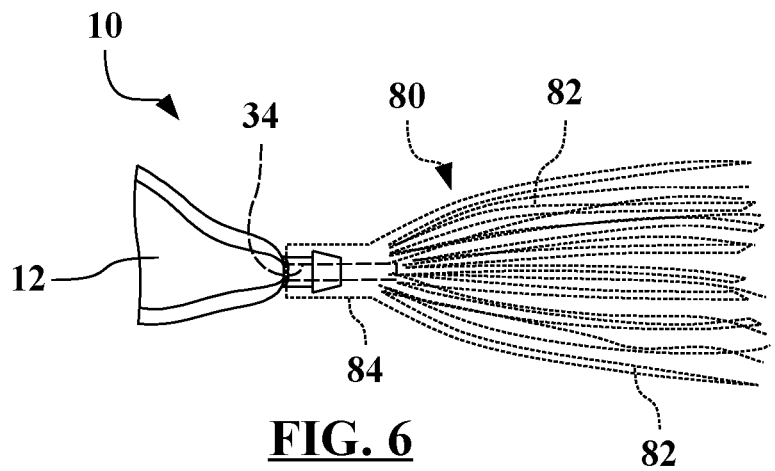
FIG. 6 is a side view of a portion of the diving bubbler lure, illustrating an optional skirt attached at, or near, a fluid exit.

Referring also to FIG. 6, and with continued reference to FIGS. 1-5B, there is shown a view a portion of the lure 10. As shown in FIG. 6, the fluid exit 34 may include a feature to attach an optional skirt 80. Note that in the view of FIG. 6 the rear of the lure 10, including the fluid exit 34, is facing to the right, the opposite direction of several other figures.

The skirt 80 is a feature added to enhance the overall lure action and to make the lure 10 more enticing to fish. The skirt 80 consists of skirt arms 82 which create movement enhancing the movement of the lure 10. A cylindrical attachment interface 84 slides over a tapered lip surrounding the fluid exit 34. The tapered lip prevents the skirt 80 from sliding off of the lure body 12. In the configuration shown, bubbles 20 would escape through the fluid exit 34 and then through the skirt 80. Note, however, that the skirt 80 does not necessary need to attach around the fluid exit 34, and may be attached to other portions of the lure 10, via other attachment mechanisms.

Figure 7A:
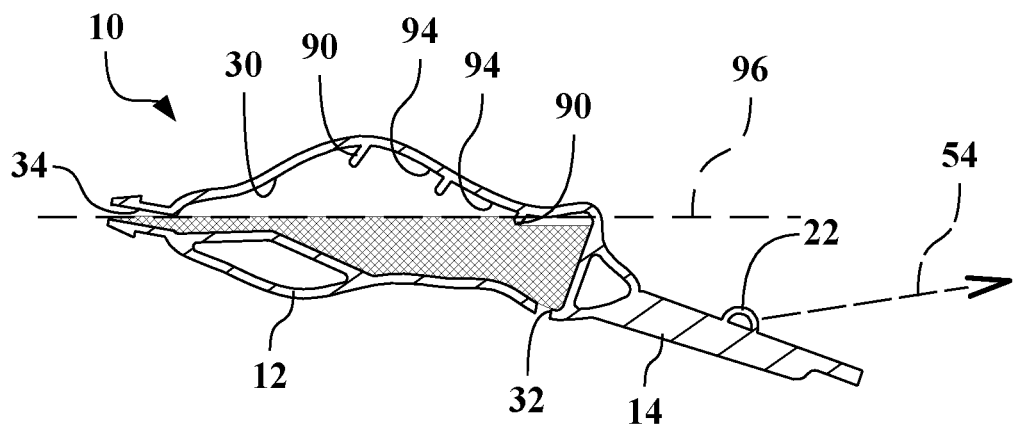
FIG. 7A is another plane intersection view of the diving bubbler lure taken generally along the line C-C of FIG. 2B, illustrating a plurality of air saver ribs.
Figure 7B:
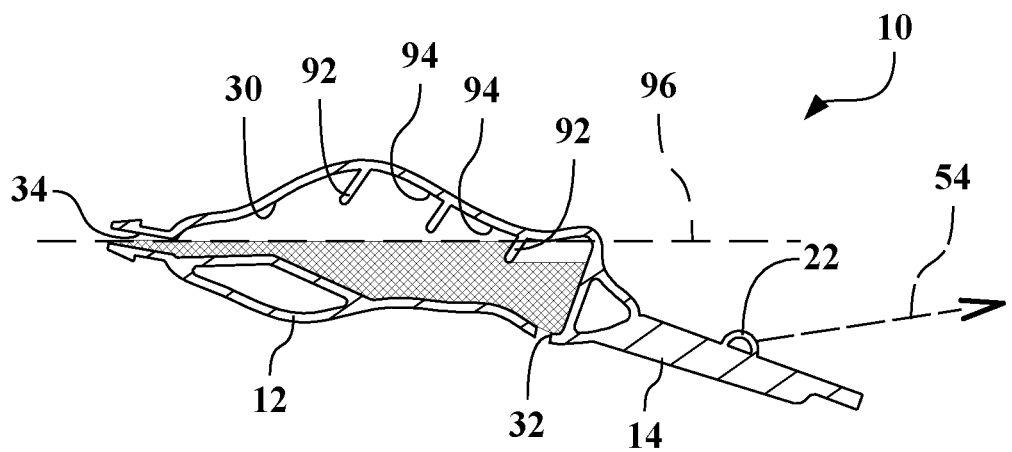
FIG. 7B is also a plane intersection view of the diving bubbler lure taken generally along the line C-C of FIG. 2B, illustrating a plurality of extended air saver ribs.

Referring now to FIGS. 7A and 7B, and with continued reference to FIGS. 1-6, there are shown additional plane-intersection views of the lure 10. FIG. 7A shows the lure 10 with a plurality of air saver ribs 90, and FIG. 7B shows the shows the lure 10 with a plurality of extended air saver ribs 92. The air saver ribs 90 and the extended air saver ribs 92 extend from the upper portion of the body 12, relative to gravity during normal orientation of the lure 10, downward into the air cavity 30.

The air saver ribs 90 effectively extend the volume of the air cavity 30 during the retrieval process, if a large volume of exit bubbles 20 is released during a single jerk 54. Therefore, the air saver ribs further allow the lure 10 to create exit bubbles 20 for the majority of the retrieval time.

As shown in FIGS. 7A and 7B, the air saver ribs 90 and the extended air saver ribs 92, respectively, trap air by creating a plurality of partitioned volumes 94 within the air cavity 30. During aggressive, or extended, tilting of the lure 10 caused by the jerk 54, the air saver ribs 90 prevent all air from escaping the air cavity 30, as at least one of the partitioned volumes 94 is closed off by water within the air cavity 30 and traps a small volume of air therein.

As shown in the configurations of both FIGS. 7A and 7B, a theoretical fill line 96 would be created by the angle of the lure 10. However, the partitioned volumes 94 retain more air within the air cavity 30 than would be retained at the theoretical fill line 96 without the air saver ribs 90 or the extended air saver ribs 92. This is the case even when the lure 10 is tilted further downward, such that a large tilt angle does not drain all air from the air cavity 30.

The air saver ribs 90 and the extended air saver ribs 92 offset the volume of the air cavity, such that they affect the volume of the air cavity 30 and the partitioned volumes 94 grow larger. A volume tradeoff can be seen in FIGS. 7A and 7B, which are both filled to the same theoretical fill line 96. In FIG. 7A, the air saver ribs 90 are relatively small, which creates more volume in the air cavity 30, but smaller partitioned volumes 94. In FIG. 7B, the extended air saver ribs 92 are longer, which reduces the air cavity 30, but creates, relatively, larger partitioned volumes 94. The lure 10 may optimize the overall size of the lure body 12 to achieve the target volume of the air cavity 30 while having the air saver ribs 90 provide an adequate dimension for the partitioned volumes 94.

The detailed description and the drawings or figures are supportive and descriptive of the disclosure. While some of the best modes and other embodiments for carrying out the disclosure have been described in detail, various alternative designs, configurations, and embodiments exist for practicing the appended claims.

The invention claimed is:

1. A fishing lure configured to be pulled below water, comprising:
 a body defining an air cavity;
 a first hole defined at a first end of the body; and
 a second hole defined at a second end of the body, opposite the first end,
 wherein the air cavity is configured to carry air into the water and to progressively replace the carried air with the water, and
 wherein the first hole and the second hole are below a centerline of the air cavity, such that water within the air cavity blocks the first hole and the second hole when the fishing lure is not tilted.

2. The fishing lure of claim 1, further comprising:
 a diving lip extending from the first end of the body, wherein the diving lip is configured to introduce fluidic downforce, such that the fishing lure is tilted when a force is introduced to the fishing lure.

3. The fishing lure of claim 2, further comprising:
 a plurality of air saver ribs extending from an upper portion of the body downward into the air cavity, such that the air saver ribs define a plurality of partitioned volumes within the air cavity.

4. The fishing lure of claim 3,
 wherein bubbles are created by carried air escaping the air cavity, and
 wherein bubbles are not created from the water by cavitation or from the water by pressure differential.

5. The fishing lure of claim 1, further comprising:
 a plurality of air saver ribs extending from an upper portion of the body downward into the air cavity, such that the air saver ribs define a plurality of partitioned volumes within the air cavity.

6. A fishing lure configured to be pulled below water, comprising:
 a body defining an air cavity;
 a first hole defined at a first end of the body and in communication with the air cavity; and
 a second hole defined at a second end of the body, opposite the first end, and in communication with the air cavity,
 wherein the air cavity is configured to carry air into the water and to progressively force the carried air to escape from the body via one of the first hole and the second hole, and
 wherein the first hole and the second hole are below a centerline of the air cavity, such that water within the air cavity blocks the first hole and the second hole when the fishing lure is not tilted.

7. The fishing lure of claim 6,
 wherein water enters the air cavity through the first hole, and
 wherein carried air escapes the air cavity through the second hole.

8. A fishing lure configured to be pulled below water, comprising:
 a body defining an air cavity;
 a first hole defined at a first end of the body;
 a second hole defined at a second end of the body, opposite the first end; and
 a plurality of air saver ribs extending from an upper portion of the body downward into the air cavity, such that the air saver ribs define a plurality of partitioned volumes within the air cavity,
 wherein the air cavity is configured to carry air into the water and to progressively replace the carried air with the water.

9. The fishing lure of claim 8, further comprising:
 a diving lip extending from the first end of the body, wherein the diving lip is configured to introduce fluidic downforce, such that the fishing lure is tilted when a force is introduced to the fishing lure.

10. The fishing lure of claim 9,
 wherein bubbles are created by carried air escaping the air cavity, and wherein bubbles are not created from the water by cavitation or from the water by pressure differential.

* * * * *